United States Patent Office 3,216,444
Patented Nov. 9, 1965

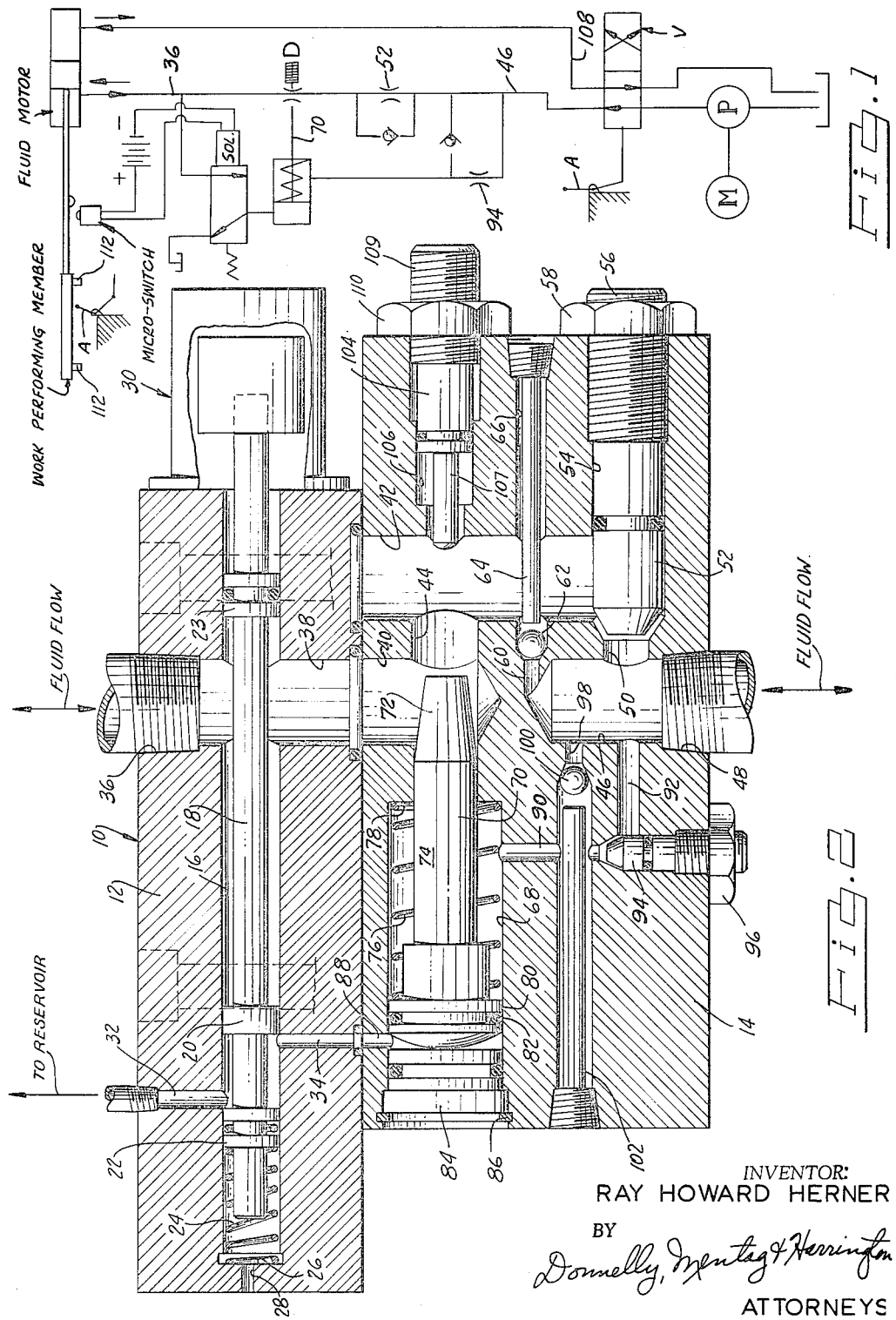

3,216,444
BI-DIRECTIONAL VARIABLE FLOW RATE
CONTROL VALVE
Ray Howard Herner, 122 W. Maple St., Alpena, Mich.
Filed Sept. 2, 1964, Ser. No. 393,957
7 Claims. (Cl. 137—495)

This application is a continuation-in-part of application Serial No. 84,631, filed Jan. 24, 1961, now abandoned.

My invention relates generally to a control system for fluid pressure operated mechanisms, and more particularly to valve structure for use in the hydraulic circuit of fluid pressure operated machinery.

The improved control system of my invention is capable of regulating the rate of movement of movable portions of motor powered machinery or the like. It finds particular utility in control systems that are used for regulating the velocity and deceleration of a movable, reciprocating carriage for a machine tool, but it is capable also of being used in other environments having reciprocating, pressure actuated parts. The carriage for machine tools usually is actuated by means of a fluid pressure operated cylinder and piston mechanism.

I am aware of various conventional devices that are used for controlling the velocity and deceleration of tool holders for certain machine tools, or for controlling the rate of feed for a cutting tool on an automatic machine. These include either a fixed or a manually adjustable orifice in communication with the working chamber within the fluid pressure cylinder. The orifice is located in the exhaust line of the cylinder. The rate of advance or the rate at which the reciprocating portion of the machine is retracted during any given working cycle remains constant since the pressure drop provided by the orifice remains constant for any given size orifice.

It is possible, of course, to vary the rate of movement of the reciprocating portion of the machine by changing appropriately the size of the orifice. This can be done by providing a mechanical linkage between the movable machine part and an orifice changing mechanism with a tapered metering rod. Such a linkage usually requires cams having pre-calibrated profiles that can be actuated by means of a movable part of the mechanism, such as a piston rod. In this way the velocity of the movable parts can be increased during certain stages of the operating cycle and can be reduced during other stages. This arrangement has disadvantages, however, since the mechanical linkage must be attached in some fashion to the movable piston rod and this imposes side loads on the piston rod.

I am aware also of motion controlling devices that employ bushings carried by the piston rod in such a fashion that they will enter into an exhaust port communicating with the working chamber of the cylinder. The bushings can be made of varying sizes so that during a given operating cycle, the rate of advance of the piston rod will be varied as desired. This type of control is undesirable, however, since the rate of movement and deceleration of the piston rod does not vary after the bushings and exhaust porting have been assembled. The motion controlling characteristics of such a mechanism cannot be changed without completely rebuilding the hydraulic cylinder and piston structure.

According to a principal feature of my improved mechanism, I have invented a valve system for varying the rate of advance and deceleration of a hydraulic cylinder of this type. It includes a valve device that can be positioned remotely with respect to the hydraulic cylinder so that the movable portion of the mechanism that is controlled by means of our improved system can be decelerated over a long distance or a relatively shorter distance as desired. The valve system can be calibrated to meet any operating requirement.

The provision of an improved control system of the type above set forth being a principal object of my invention, it is a further object of my invention to provide a control for a movable fluid pressure operated part wherein the rate of deceleration can be controlled by the operator.

It is also an object of my invention to provide a means for controlling the rate of deceleration of a hydraulic cylinder and piston mechanism of the type previously described and which eliminates the need for providing a mechanical linkage and motion transmitting cam elements between the piston rod and the valve structure.

It is a further object of my invention to provide a mechanism of the type above set forth wherein the rate of deceleration of a fluid pressure operated piston can be controlled without introducing an undesirable side load on the piston rod.

For the purpose of particularly describing my improved structure, reference will be made to the accompanying drawing wherein:

FIG. 1 is a schematic circuit drawing of my improved valve system; and,

FIG. 2 is a cross sectional assembly view of my improved valve structure.

My valve system is comprised of a bipartite valve body generally identified by reference character 10. The body 10 includes a first portion 12 and a second portion 14, and these may be secured together in a conventional fashion by means of bolts. Position 12 comprises a solenoid valve chamber 16 within which is slidably positioned a solenoid operated valve element 18. This valve element 18 includes a valve land 20 and a pair of axially spaced sealing shoulders 22 and 23. Each of the shoulders 22 and 23 is formed with an annular groove within which is positioned an O-ring or another suitable fluid seal.

Valve element 18 is urged in a right-hand direction, as viewed in FIG. 2, by means of a valve spring 24 that is seated on one end 26 of the valve chamber 16. The spring 24 also acts on one side of the shoulder 22.

The region of the chamber 16 on the left hand side of the shoulder 22, as viewed in FIG. 2, communicates with the exhaust region through an exhaust passage 28. This avoids trapping of fluid in the end of the chamber 16.

Element 18 extends outwardly from the valve body portion 12 and it is connected operatively to an electrical solenoid generally designated by reference character 30. Solenoid 30 can be bolted to the side of body portion 12, and when it is energized the valve element 18 is shifted in a left hand direction as viewed in FIG. 2 against the opposing force of spring 24.

The annular space formed between the shoulder 22 and the land 20 communicates with a fluid reservoir through a passage 32. Another passage 34 is located in the body portion 12 directly adjacent land 20. When the electrical solenoid is de-energized, the valve element 18 assumes the position shown in FIG. 2, and the passage 32 is in direct communication with passage 34. When the electrical solenoid is energized, the valve element 18 is shifted in a left hand direction as viewed in FIG. 2 so that valve land 20 becomes situated on the left hand side of passage 34 as viewed in FIG. 2. Passage 34 then is in fluid communication with a fluid pressure port 36. The annular space between shoulder 23 and land 20 provides fluid communication between passage 34 and the port 36. A passage 38 also communicates with the annular space between shoulder 23 and land 20.

Body portion 14 is formed with a passage 40 and a passage 42 that are situated in generally parallel relationship as shown. They are in fluid communication with each other by means of a branch passage 44. A third passage 46 also is formed in body portion 14 and it communicates directly with port 48. Passage 46 communicates with passage 42 through a branch passage 50. The passage 50 is controlled in turn by means of an adjustable valve element 52 that is formed with a contoured nose that registers with a cooperating tapered annular seat about the periphery of passage 50. The valve element 52 is received threadably within a metering valve chamber 54 and it is formed with a threaded portion 56 that extends outwardly with respect to the body portion 14. A lock nut or other securing device 58 can be used to retain the valve element 52 in any desired adjusted position.

Passage 46 also communicates with passage 42 through a by-pass passage 60 that is controlled by a ball check valve element 62. Valve element 62 is disposed in passage 60 and is adapted to seat against an annular shoulder within the passage 60 as shown in FIG. 2. Valve element 62 will permit transfer of fluid under pressure from passage 46 to passage 42, but it will inhibit transfer of fluid in a reverse direction from passage 42 to passage 46. A stop 64 is located with one end thereof directly adjacent ball check valve element 62. The other end of stop 64 is threadably received within a cooperating opening 66.

Body portion 14 also is formed with a valve chamber 68 within which is slidably positioned a metering valve element 70. This valve element includes a reduced diameter portion on which a nose 72 with a calibrated contour is formed. This reduced diameter portion is positioned within a cooperating reduced diameter portion of the opening of the chamber 68, said reduced diameter portion being identified by reference character 74. The nose 72 extends within passage 40 and is adapted to be received within connecting passage 44 so that the degree of communication between passages 40 and 42 can be controlled. When the valve element 70 assumes the position shown, free communication is established between passages 40 and 42. If valve element 70 is moved in a right hand direction, however, nose 72 will decrease this degree of communication.

Valve element 70 is normally urged in a left hand direction by a valve spring 76 situated between the end 78 of valve chamber 68 and a relatively large diameter shoulder 80 formed thereon. The shoulder 80 includes an annular groove within which an O-ring 82 is situated.

The end of chamber 68 is closed by means of a closure member 84 and it is held in place at the end of the valve chamber 68 by means of a suitable snap ring 86. A fluid pressure chamber is defined by the valve chamber 68 between the closure member 84 and the shoulder 80. This pressure chamber is in fluid communication with passage 34 in the body portion 12 by means of a passage 88.

The portion of the chamber 68 on the right hand side of shoulder 80, as viewed in FIG. 2, communicates with passage 90 that extends to a cross-over passage 92, the latter in turn communicating with the aforementioned port 48. The metering valve element 94 is situated in an enlarged diameter portion of passage 90 and is formed with a tapered semi-conical nose that cooperates with a conical valve seat as indicated. The valve element 94 is substantially cylindrical in shape and is formed with an annular groove within which a sealing elements is positioned. It is also formed with a threaded portion that is connected threadably to an internally threaded part of the passage 90. The lock nut 96 maintains the element 94 in place once it has been adjusted to its proper metering position.

Passage 90 also communicates with passage 46 through a by-pass passage 98 that is controlled by means of a one-way check valve element 100. Valve element 100 permits fluid flow to take place from passage 46 to passage 90 but inhibits such flow in the reverse direction. The passage 98 extends to the exterior of the body portion 14 and accommodates a stop 102 having one end thereof positioned adjacent the valve element 100. The other end of the stop 102 is threadably connected to the body portion 14 as indicated.

Valve element 94 provides a restricted degree of communication between passage 90 and 92, and this degree can be controlled by the operator by suitably adjusting the same.

An adjustable stop is shown at 104 and it is received threadably within a cooperating opening 106. Element 104 includes an extension 107 that can be extended into passage 44 so that it will be engaged by the nose 72 of the valve element 70. Element 104 includes a threaded portion 109 which is threadably received within a cooperating threaded portion of the opening 106. A lock nut 110 can be provided to retain the element 104 in place.

For purposes of describing the operation of my invention, it will be assumed that the port 36 is connected to the exhaust conduit for a hydraulic motor in the form of a cylinder and piston mechanism. This motor is shown at D in FIG. 1. When the piston is actuated, fluid is displaced from the motor and flows through passage 38, through passage 44, through passage 42, passage 50 and passage 46 to the outlet port 48. Valve element 52 is preadjusted to meet particular operating requirements.

A suitable limit switch is located in the circuit for the electrical solenoid and it can be actuated when desired during the piston stroke. This causes the valve element 18 to shift in a left hand direction as viewed in FIG. 2 thus establishing fluid communication between fluid pressure inlet port 36 and the chamber on the left hand side of valve element 70. This causes the valve element 70 to move in a right hand direction against the opposing force of spring 76. This movement causes fluid to be displaced from the right hand side of the enlarged diameter shoulder 80 of valve element 70, and this displaced fluid passes through the restriction formed by valve element 94. The rate of movement of valve element 70 can therefore be controlled by suitably adjusting the valve element 94.

Movement of the valve element 70 to the right causes the degree of restriction between passages 40 and 42 to increase. This restriction is caused by the nose 72 of the valve element 70. The restriction thus provided is additive to the restriction provided by the valve element 52. The rate of displacement of fluid from the cylinder and piston mechanism will therefore decrease, and this of course results in a deceleration of the movable portion of the mechanism such as the reciprocating carriage or table of the machine tool.

It is desirable in these instances to return the piston of the fluid motor as quickly as possible to the starting position. This is accomplished by the check valves 100 and 62. Check valve 62 will permit fluid to by-pass the restriction at passage 50. In a similar fashion, check valve 100 will open when the piston is retracted thereby allowing fluid to be admitted to the right hand side of the chamber 68. Spring 76 will then freely retract the valve element 70 to the position shown in FIG. 2. The restriction provided by the element 94 is thereby by-passed. During this reverse stroke, the electrical solenoid circuit is interrupted and the valve element 18 will be returned under the influence of spring 24 to the position shown in FIG. 2. This again allows the chamber on the left hand side of the element 70 to communicate freely with the reservoir through passages 34 and 32.

In the embodiment of FIG. 2, I have provided also an adjustable stop previously identified by reference character 104. If the stop 104 is moved in a left hand direction, the nose 72 of element 70 will engage the same and the forward motion of the element 70 will thereby be inhibited during the working cycle. The reciprocating piston, under these circumstances, will be decelerated in the fashion previously described, but this deceleration will discontinue as soon as the nose 72 engages the extended portion 106 of the stop 104. The piston will thereafter travel a constant velocity since the restriction in the fluid flow path will be maintained at a constant value. This type of motion may be of advantage in certain special types of machinery that employ automatic feeding devices.

In FIG. 1, the fluid displacement device that actuates the work performing member is in the form of a fluid motor having a piston rod adapted to actuate a microswitch that in turn controls the operation of the solenoid. A passage 108 extends to one side of the piston of the fluid motor and, as previously explained, the passages 46 and 36 extend to the opposite side of the piston. Applicant's improved valve arrangement is situated in and partly defines the passages 46 and 36.

A two-position valve V is disposed in passages 46 and 108 for the purpose of controlling the direction of fluid flow to and from either side of the piston for the fluid motor. When the valve V is positioned as shown, pressure is distributed from pump P to the passage 46 and fluid is returned from passage 108 to the low pressure sump. When the valve assumes the other position, the passage 46 acts as a return passage and the passage 108 acts as a fluid pressure distribution passage which distributes working fluid to the fluid motor during the working stroke. The pump P is driven by any suitable motor M.

The position of the valve V can be controlled by a suitable linkage identified generally as A. The linkage may include a toggle lever that is shifted from one position to the other by suitable dogs carried by the work performing member. These dogs are illustrated at 112 in FIG. 1. As the work performing member assumes one extreme position during the working cycle, one of the dogs shifts the linkage mechanism A to one position. Upon returning to the other extreme position, the other dog 112 shifts the linkage mechanism A in the opposite direction.

Having thus described a preferred embodiment of my invention, what I claim and desire to secure by United States Letters Patent is:

1. In a valve control system for a fluid displacement device, a valve body, a fluid passage in said valve body having a first port and a second port adapted to be connected to a fluid displacement device and a sump, respectively, said fluid passage being subjected to fluid flow in in a first direction from said first port to said second port and in a second direction from said second port to said first port, a valve port and a valve chamber defining in part said passage, a cavity formed in said valve body, a pressure actuated valve element mounted in said valve chamber for reciprocation toward and away from said valve port to restrict progressively the fluid flow through said passage, said valve element having an actuator connected thereto and mounted for reciprocation in said cavity, means for admitting fluid under pressure to said cavity on one side of said actuator to actuate said valve element toward said valve port to restrict said valve port and for exhausting fluid from said cavity from said one side of said actuator, means for normally urging said actuator in a direction to actuate the valve element away from said valve port, secondary passage means connecting said second port with said cavity on the opposite side of said actuator, said actuator being adapted to displace fluid from said cavity through said secondary passage means on movement thereof in a valve port closing direction, means for controlling the degree of restriction to fluid flow through said secondary passage means to said second port when flow through said fluid passage is in said first direction and for accommodating unobstructed flow therethrough from said second port when flow through said fluid passage is in said second direction whereby the rate of movement of said valve element is controlled, and means in series with said valve port for restricting the fluid flow through said fluid passage when the direction of flow is toward said second port and for accommodating relatively unobstructed flow therethrough when the direction of flow is toward said first port.

2. In a valve control system for a fluid displacement device, a valve body, a fluid passage in said valve body having a first port and a second port adapted to be connected to a fluid displacement device and a sump, respectively, said fluid passage being subjected to fluid flow in a first direction from said first port to said second port and in a second direction from said second port to said first port, a valve port and a valve chamber defining in part said passage, a cavity formed in said valve body, a pressure actuated valve element mounted in said valve chamber for reciprocation toward and away from said valve port to restrict progressively the fluid flow through said passage, said valve element having an actuator connected thereto and mounted for reciprocation in said cavity, means for admitting fluid under pressure to said cavity on one side of said actuator to actuate said valve element toward said valve port to restrict said valve port and for exhausting fluid from said cavity from said one side of said actuator, secondary passage means connecting said second port with said cavity on the opposite side of said actuator, said actuator being adapted to displace fluid from said cavity through said secondary passage means on movement thereof in a valve port closing direction, means for controlling the degree of restriction to fluid flow through said secondary passage means to said second port when flow through said fluid passage is in said first direction and for accommodating unobstructed flow therethrough from said second port when flow through said fluid passage is in said second direction whereby the rate of movement of said valve element is controlled, means in series with said valve port for restricting the fluid flow through said fluid passage when the direction of flow is toward said second port and for accommodating relatively unobstructed flow therethrough when the direction of flow is toward said first port, and spring means for normally urging said valve element away from said valve port.

3. In a valve control system for a fluid displacement device, a valve body, a fluid passage in said valve body having a first port and a second port adapted to be connected to a fluid displacement device and a sump, respectively, said fluid passage being subjected to fluid flow in a first direction from said first port to said second port and in a second direction from said second port to said first port, a valve port and a valve chamber defining in part said passage, a cavity formed in said valve body, a pressure actuated valve element mounted in said valve chamber for reciprocation toward and away from said valve port to restrict progressively the fluid flow through said passage, said valve element having an actuator connected thereto and mounted for reciprocation in said cavity, means for admitting fluid under pressure to said cavity on one side of said actuator to actuate said valve element toward said valve port to restrict said valve port and for exhausting fluid from said cavity from said one side of said actuator, secondary passage means connecting said second port with said cavity on the opposite side of said actuator, said actuator being adapted to displace fluid from said cavity through said secondary passage means on movement thereof in a valve port closing direction, means for controlling the degree of restriction to fluid flow through said secondary passage means to said second port when flow through said fluid passage is in said first direction and for accommodating unobstructed flow therethrough from said second port when flow through said fluid passage is in said second direction whereby the rate of movement of said valve element is controlled, and a spring means for normally biasing said valve element away from said valve port, said means for admitting fluid to said cavity and for exhausting fluid from said cavity comprising a selectively operable distributor valve means in fluid communication with said first port for alternately establishing and interrupting communication between said first port and said cavity on said one side of said actuator.

4. In a valve control system for a fluid displacement device, a valve body, a fluid passage in said valve body having a first port and a second port adapted to be connected to a fluid displacement device and a sump, respectively, said fluid passage being subjected to fluid flow in a first direction from said first port to said second port and in a second direction from said second port to said first port, a valve port and a valve chamber defining in part said passage, a cavity formed in said valve body, a pressure actuated valve element mounted in said valve chamber for reciprocation toward and away from said valve port to restrict progressively the fluid flow through said passage, said valve element having an actuator connected thereto and mounted for reciprocation in said cavity, means for admitting fluid under pressure to said cavity on one side of said actuator to actuate said valve element toward said valve port to restrict said valve port and for exhausting fluid from said cavity from said one side of said actuator, secondary passage means connecting said second port with said cavity on the opposite side of said actuator, said actuator being adapted to displace fluid from said cavity through said secondary passage means on movement thereof in a valve port closing direction, means for controlling the degree of restriction to fluid flow through said secondary passage means to said second port when flow through said fluid passage is in said first direction and for accommodating unobstructed flow therethrough from said second port when flow through said fluid passage is in said second direction whereby the rate of movement of said valve element is controlled, means in series with said valve port for restricting the fluid flow through said fluid passage when the direction of flow is toward said second port and for accommodating relatively unobstructed flow therethrough when the direction of flow is toward said first port, solenoid operated valve means for selectively distributing fluid pressure from said first port to said cavity on said one side of said actuator and for exhausting fluid therefrom, and spring means for normally biasing said valve element away from said valve port, said solenoid operated valve means comprising a fluid pressure distributor valve element and a valve chamber that receives the distributor valve element, said valve chamber and said distributor valve element establishing in part a fluid connection between said first port and said cavity.

5. In a valve control system for a fluid displacement device, a valve body, a fluid passage in said valve body having a first port and a second port adapted to be connected to a fluid displacement device and a sump, respectively, said fluid passage being subjected to fluid flow in a first direction from said first port to said second port and in a second direction from said second port to said first port, a valve port and a valve chamber defining in part said passage, a cavity formed in said valve body, a pressure actuated valve element mounted in said valve chamber for reciprocation toward and away from said valve port to restrict progressively the fluid flow through said passage, said valve element having an actuator connected thereto and mounted for reciprocation in said cavity, means for admitting fluid under pressure to said cavity on one side of said actuator to actuate said valve element toward said valve port to restrict said valve port and for exhausting fluid from said cavity from said one side of said actuator, secondary passage means connecting said second port with said cavity on the opposite side of said actuator, said actuator being adapted to displace fluid from from said cavity through said secondary passage means on movement thereof in a valve port closing direction, means for controlling the degree of restriction to fluid flow through said secondary passage means to said second port when flow through said fluid passage is in said first direction and for accommodating unobstructed flow therethrough from said second port when flow through said fluid passage is in said second direction whereby the rate of movement of said valve element is controlled, means in series with said valve port for restricting the fluid flow through said fluid passage when the direction of flow is toward said second port and for accommodating relatively unobstructed flow therethrough when the direction of flow is toward said first port, solenoid operated valve means for selectively distributing fluid flow through said secondary passage means to said one side of said actuator and for exhausting fluid therefrom, spring means for normally biasing said valve element away from said valve port, said solenoid operated valve means comprising a fluid pressure distributor valve element and a valve chamber that receives the distributor valve element, said valve chamber and said distributor valve element establishing in part a fluid connection between said first port and said cavity, and means for limiting the extent of movement of said valve element towards said valve port.

6. In a valve control system for a fluid displacement device, a valve body, a fluid passage in said valve body having a first port and a second port adapted to be connected to a fluid displacement device and a sump, respectively, said fluid passage being subjected to fluid flow in a first direction from said first port to said second port and in a second direction from said second port to said first port, a valve port and a valve chamber defining in part said passage, a cavity formed in said valve body, a pressure actuated valve element mounted in said valve chamber for reciprocation toward and away from said valve port to restrict progressively the fluid flow through said passage, said valve element having an actuator connected thereto and mounted for reciprocation in said cavity, means for admitting fluid under pressure to said cavity on one side of said actuator to actuate said valve element toward said valve port to restrict said valve port and for exhausting fluid from said cavity from said one side of said actuator, secondary passage means connecting said second port with said cavity on the opposite side of said actuator, said actuator being adapted to displace fluid from said cavity through said secondary passage means on movement thereof in a valve port closing direction, means for controlling the degree of restriction to fluid flow through said secondary passage means to said second port when flow through said fluid passage is in said first direction and for accommodating unobstructed flow therethrough from said second port when flow through said fluid passage is in said second direction whereby the rate of movement of said valve element is controlled, means in series with said valve port for restricting the fluid flow through said fluid passage when the direction of flow is toward said second port and for accommodating relatively unobstructed flow therethrough when the direction of flow is toward said first port, solenoid operated valve means for selectively distributing fluid pressure from said first port to said cavity on said one side of said actuator and for exhausting fluid therefrom, spring means for normally biasing said valve element away from said valve port, said solenoid operated valve means comprising a fluid pressure distributor valve element and a valve chamber that receives the distributor valve element, said valve chamber and said distributor valve element establishing in part a fluid connection between said first port and said cavity, and means for limiting the extent of movement of said valve element towards said valve port, said fluid flow restricting means in series with said valve port comprising a valve opening and adjustable valve element movable toward and away from said valve opening, said valve opening defining a portion of said fluid passage.

7. In a valve control system for a fluid displacement device, a valve body, a fluid passage in said valve body having a first port and a second port adapted to be connected to a fluid displacement device and a sump, respectively, said fluid passage being subjected to fluid flow in a first direction from said first port to said second port and in a second direction from said second port to said first port, a valve port and a valve chamber defining in part said passage, a cavity formed in said valve body, a pressure actuated valve element mounted in said valve chamber for reciprocation toward and away from said valve port to restrict progressively the fluid flow through said passage, said valve element having an actuator connected thereto and mounted for reciprocation in said cavity, means for admitting fluid under pressure to said cavity on one side of said actuator to actuate said valve element toward said valve port to restrict said valve port and for exhausting fluid from said cavity from said one side of said actuator, secondary passage means connecting said second port with said cavity on the opposite side of said actuator, said actuator being adapted to displace fluid from said cavity through said secondary passage means on movement thereof in a valve port closing direction, means for controlling the degree of restriction to fluid flow through said secondary passage means to said second port when flow through said fluid passage is in said first direction and for accommodating unobstructed flow therethrough from said second port when flow through said fluid passage is in said second direction whereby the rate of movement of said valve element is controlled, means in series with said valve port for restricting the fluid flow through said fluid passage when the direction of flow is toward said second port and for accommodating relatively unobstructed flow therethrough when the direction of flow is toward said first port, and spring means for normally urging said valve element away from said valve port, said fluid flow restricting means in series with said valve port comprising a valve opening and an adjustable valve element movable toward and away from said valve opening, said valve opening defining a portion of said fluid passage.

References Cited by the Examiner

UNITED STATES PATENTS

| | | | |
|---|---|---|---|
| 2,384,760 | 9/45 | Matulionis | 91—443 |
| 2,501,483 | 3/50 | Taylor | 91—443 X |
| 2,583,242 | 1/52 | Turkenkoph et al. | 91—443 |
| 2,655,945 | 10/53 | Harris | 138—46 |
| 2,984,261 | 5/61 | Kates | 138—46 |

ISADOR WEIL, *Primary Examiner.*

MARTIN P. SCHWADRON, *Examiner.*